No. 880,297. PATENTED FEB. 25, 1908.
F. R. GRAHAM-YOOLL.
SHOCK ABSORBING DEVICE FOR CYCLES.
APPLICATION FILED APR. 3, 1907.
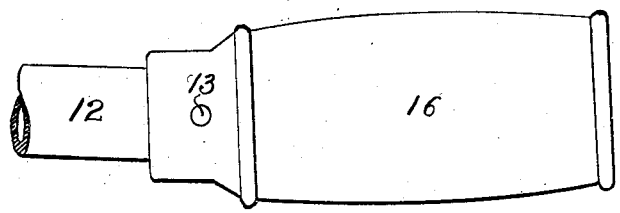
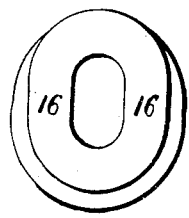
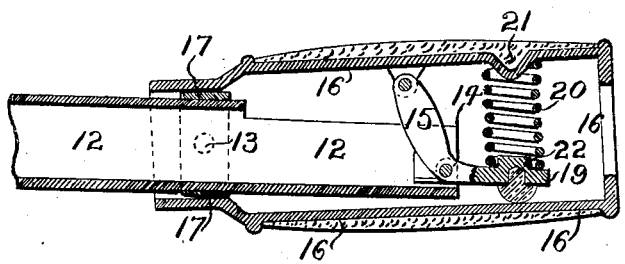
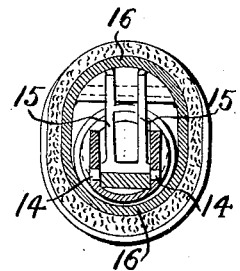
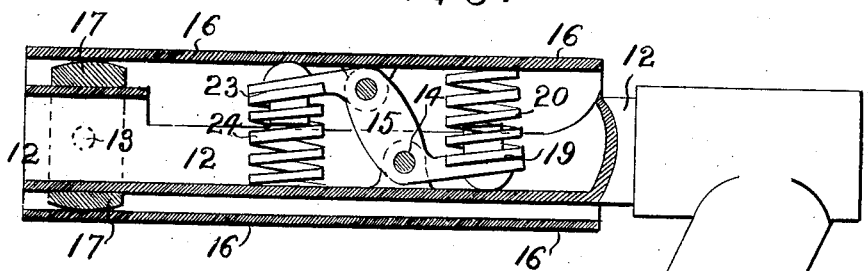
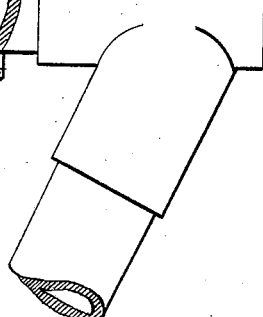
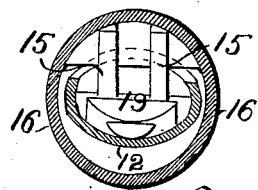
WITNESSES
INVENTOR
ATTORNEYS

UNITED STATES PATENT OFFICE.

FREDERICK R. GRAHAM-YOOLL, OF LEITH, SCOTLAND.

SHOCK-ABSORBING DEVICE FOR CYCLES.

No. 880,297.  Specification of Letters Patent.  Patented Feb. 25, 1908.

Application filed April 3, 1907. Serial No. 366,174.

*To all whom it may concern:*

Be it known that I, FREDERICK RICHARD GRAHAM-YOOLL, a subject of the King of Great Britain and Ireland, and a resident of Leith, in the county of Midlothian, Scotland, have invented certain new and useful Improvements in Shock-Absorbing Devices for Cycles, and of which the following is the specification.

This invention has for its object to provide improved, simple and effective devices for the insulation from shock and from vibration of handles and other parts of cycles, and the like, such as saddle pillars; also foot rests, when the device is to be used on a motor cycle. Hitherto, such devices as applied to handles and saddle pillars have only been capable of more or less vertical motion or of motion about a point (or hinge) or upon a pair of links. Such devices are largely ineffective in that the shocks most felt are those due to the inertia of the rider when the cycle is obstructed by encounter with an obstacle—that is to say, the tendency under these circumstances is for the rider to move forward upon the machine. The anti-vibration devices hitherto devised have been ineffective in that they did not materially absorb shock in this direction. The improved devices, while effective in absorbing vertical vibration, are also such that they effectively absorb longitudinal shock and vibration and are therefore of great advantage.

The essential feature of the invention is that the movable part—it may be the handle or it may be that part of the saddle pillar which carries the saddle—is hinged upon an angled link at the one end and at the other is adapted to slide upon the fixed part of the handle-bar or saddle pillar at the same time moving vertically to some extent, while between the parts a spring (or springs) is arranged in a novel manner hereinafter explained.

In order that the invention and the manner of performing the same may be properly understood, there is hereunto appended a sheet of explanatory drawings, throughout which like reference numerals indicate similar parts, and in which—

Figures 1, 2, 3, and 4, are, respectively, a side elevation, an end elevation, a longitudinal vertical section, and a transverse vertical section of an example of the improved device applied to a handle; while Figs. 5 and 6, are, respectively, a sectional side elevation and a transverse vertical section of a like example applied to a saddle pillar.

In carrying out the invention according to the example shown in Figs. 1, 2, 3, and 4, the handle bar, 12, has a portion removed from its upper side near its end (or a corresponding portion might, instead be secured to the end of the handle bar). The sides of the outer end of this part are somewhat flattened to receive a transverse pin, 14 (or a liner to receive the pin might be arranged within the tube) upon which is centered a lever, 15. The opposite end of this lever, 15, is secured in an ovoid tube, 16, forming the handle, and of such dimensions as to embrace the handle-bar end. It is covered with any suitable material offering a firm grip—such as leather, felt, or cork. Or it may be a plain tube uncovered. At its inner end it is connected by short rivets, 13 (which act as horizontal pivots) to a ring, 17, fitted to slide upon the handle-bar, 12, the rivets allowing of angling movement of the handle relatively to the ring, 17, and handle-bar, 12. The handle tube, 16, projects sufficiently far beyond the ring, 17, to prevent the abrasions made by the ring upon the tube, 12, from showing. In order to simplify construction the ring, 17, may be dispensed with and a rubbing projection be formed upon the interior of the handle tube, 16, but this arrangement is not so effective in that its motion is not so free.

The lever, 15, has formed upon it a heel, 19, and between an embossed guide, 21, on the handle tube, 16, and a like part, 22, on the heel, 19, there is arranged a spring, 20. Within the boss, 22, is a rubber buffer adapted to engage the interior of the handle tube, 16, and so act as a stop to limit the travel of the handle and also prevent jar.

It will be seen that when this device is in operation not only can the handle, 16, rock upon the upper end of the lever, 15, the spring, 20, being then compressed, but also a sliding movement is obtained by the turning of the lever upon its hinge pivots, and the sliding of the ring, 17, upon the handle-bar. Thus the vibration is very satisfactorily absorbed—much more satisfactorily than if the device merely allowed of vertical movement of the handle relatively to the handle-bar. The device is therefore much more satisfactory in operation than other devices which do not admit of the conjoint movements described.

The seat pillar device shown by way of example in Figs. 5 and 6, only differs from the handle-bar device just described in the matter of increased strength to withstand the more severe strains to which it is subjected, and in that the inner tube, 12, which is the horizontal member of the seat pillar is of ovoid form, with its axis horizontal in order that the outer tube, 16, carrying the saddle may be circular and so adapted for use with the usual saddle clips. In order to enhance the strength and resiliency of this arrangement, the lever, 15, in addition to the heel, 19, and spring, 20, acting between that heel and the outer tube, 16, has also a heel, 23, projecting from the lever, 16, at its opposite end and in the opposite direction. Between this heel, 23, and the inner tube, 12, there is arranged a spring, 24. This double heel and double spring arrangement may also be applied in the case of handles.

What I claim is:—

1. A shock and vibration absorbing device for cycles comprising a laterally and vertically moving part, a fixed part, an inclined link within said moving part pivoted thereto and to said fixed part, in combination with spring means between said parts, substantially as described.

2. A shock and vibration absorbing device for cycles, comprising a movable part, a fixed tubular part, a ring sliding thereon to which one end of the moving part is pivoted, an inclined link connecting between the moving part and the fixed part and a spring between the parts, as described.

3. A shock and vibration absorbing device for cycles, comprising an ovoid tubular moving part, a fixed part embraced thereby, a sliding joint between said parts, and an inclined link pivoted to said fixed part and to one end of the moving part, in combination with spring means between said parts, as described.

4. A shock and vibration absorbing device for cycles, comprising an ovoid tubular moving part, a fixed part embraced thereby, a ring sliding thereon and to which one end of the moving part is pivoted, an inclined link connecting the other end of the moving part to the fixed part and a spring between the parts, as described.

5. A shock and vibration absorbing device for cycles, comprising a moving part, a fixed part, an inclined link connecting the moving part to the fixed part, a heel piece on the link and a spring acting between it and one of the parts, as described.

6. A shock and vibration absorbing device for cycles, comprising a moving part, a fixed tubular part, a ring sliding thereon and to which one end of the moving part is pivoted, an inclined link connecting the other end of the moving part to the fixed part, a heel piece on the link and a spring acting between it and one of the parts, as described.

7. A shock and vibration absorbing device for cycles, comprising an ovoid tubular moving part, a fixed part embraced thereby, an inclined link connecting the moving part to the fixed part, a heel piece on the link and a spring acting between it and one of the parts, as described.

In testimony whereof I have signed my name to this specification, in the presence of two subscribing witnesses.

FRED. R. GRAHAM-YOOLL.

Witnesses:
GEORGE COBB,
J. T. HUTTON.